Patented Feb. 1, 1944

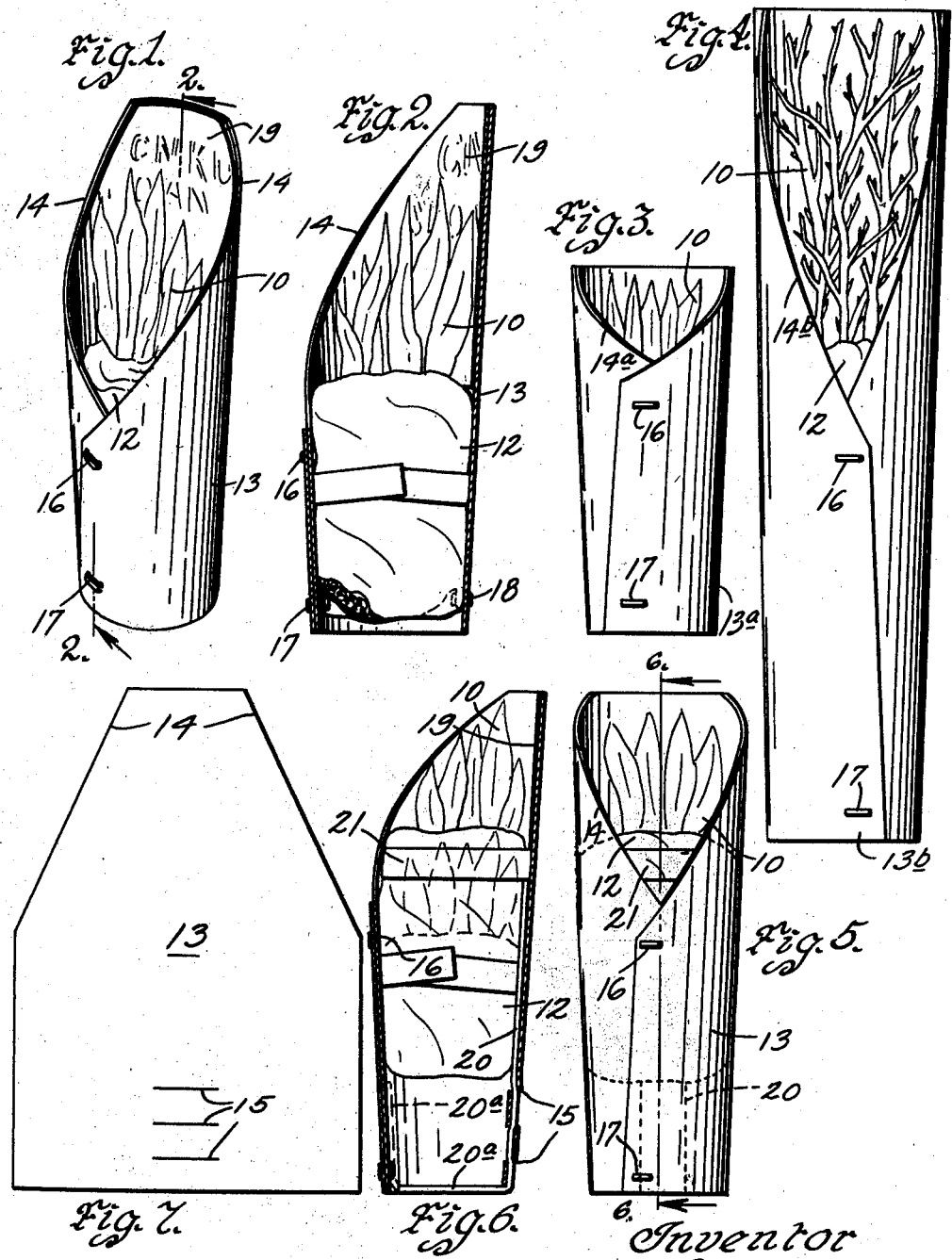

2,340,373

UNITED STATES PATENT OFFICE 2,340,373

PLANT PACK

Clark E. Gardner, Osage, Iowa

Application August 25, 1941, Serial No. 408,231

7 Claims. (Cl. 47—37)

My present invention relates to a plant pack wherein a wrapper is provided for a plant package and is secured to the package.

One object of the invention is to provide a wrapper which may be inexpensively formed of cardboard or the like in substantially rectangular shape and rolled in a truncated, cone-shaped cylinder adapted to receive a plant package in such manner as to compress the roots of the plant, yet leave the top of the plant or plants open to avoid heating and rotting when the pack is being shipped through the mail, used in display on the dealers' counters, or stored between the time it leaves the nursery and is sold to the customer.

A further object is to provide a wrapper which can be formed of a flat blank so as not to require prohibitive space at the nursery before use, but which may be quickly associated with a plant package and assembled by a simple hand stapling machine, and at the same time, position the plant package within the wrapper so that it does not thereafter move longitudinally of the wrapper.

Still a further object is to provide a wrapper which, while leaving the tops of the plant loose for ready ventilation, permits the use of a display device, such as a photograph or the like, secured inside the wrapper adjacent the top thereof so that it can be seen back of the top of the plant, the device thereby being useful as a display pack as well as a shipping and storing pack.

Still another object is to provide a modified form of construction wherein the plant package is adjustable in the wrapper so that it may assume one position for shipping and other position for display.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a perspective view of a plant pack embodying my invention.

Figure 2 is a vertical sectional view thereof on the line 2—2 of Figure 1.

Figures 3 and 4 are front elevational views of the type of plant pack shown in Figure 1 showing different proportions of the parts to illustrate the adaptability of my invention.

Figure 5 is a front elevational view of a modified construction.

Figure 6 is a vertical sectional view thereof; and

Figure 7 is a layout view of one of the blanks used for the wrapper.

On the accompanying drawing I have used the reference character 10 to indicate a plant or, more specifically, the top of the plant, and 12 a wrapping for the roots of the plant. The wrapping 12, together with the plant 10, may be termed a plant package.

When a single plant, tree, bush or shrub is packed for over counter store trade the inside package is designed to take the place and perform the functions of an ordinary flower pot. Instead of the use of damp moss, peat or other packing materials, that are used primarily to keep the roots moist, a regular potting or growing compound of humus and sawdust is used so that the plant, tree, bush or shrub so packed can start active growth in the plant pack, and by removing the outside wrapping the ball of potting compound in which roots are growing may be set intact into the ground without disturbing the plant's growth. Packed in this way the selling season is prolonged as the plant, tree, bush or shrub packed in this manner can be sold in dormant condition and also as a live growing plant after new growth has started.

Outside of the wax paper a layer of ordinary kraft paper may be used, and may be of very cheap variety in view of the use of my plant pack, consisting of a wrapper, indicated generally at 13.

The wrapper 13 is formed of cardboard or the like and in the form of a blank of the approximate shape shown in Figure 7. The blank is substantially rectangular in shape, with the two upper corners cut away at an incline, and the inclined edges being indicated at 14. The blank 13, as shown in Figure 7, may or may not have slits 15 therein, which slits are for a purpose that will hereinafter appear in connection with my description of Figure 5.

The wrapper 13 is rolled into cylindrical form around the plant package 10—12, with the lower end rolled into a smaller circumference than the upper end. Staples 16 and 17 are then inserted by the use of an ordinary hand stapling machine to hold the wrapper in its cylindrical form. The lower end is formed into a smaller circumference so that the roots of the plant 10 are tightly held with relation to the wrapper to conserve their moisture. The larger circumference adjacent the center of the wrapper, however, permits the plant package adjacent the base of the plant to be relatively loose to afford the required ventilation to prevent heating and rotting. The cylindrical wrapper, due to the difference in circumferences just mentioned, has a truncated cone shape.

The staple 17, it will be noted, passes through a lower corner of the plant package 10—12. This is readily accomplished by pushing one jaw of the stapling machine up into the plant wrapper past the lower corner and, if desired, a second staple 18 may be similarly inserted at the back of the wrapper. The plant package is thereby held in position relative to the wrapper and does not shift longitudinally in the wrapper.

A plurality of wrapped plant packs may then be placed in a cylindrical plant shipping container of the kind shown in my copending application Serial No. 383,805, filed March 17, 1941. The root ends of the plant packs may be overlapped at the center of such shipping container, which leaves the top ends of the plants loosely arranged in the end portions of the container. I have found this a very convenient way of packing plants in a shipping container and insuring that the plants will not be displaced during rough handling of the container, and yet the desired ventilation for the tops and the desired compression of the roots is efficiently obtained. The cut-away portions of the wrapper 13, which are indicated at 14, permit greater looseness for the tops of the plants, and also permit a relatively unobstructed view for a display or advertising device 19, such as a photograph or painting glued to the upper part of the wrapper. Such advertising device is useful in connection with the use of my plant pack as a display means on the dealer's counter or shelf.

The display feature can be enhanced by providing adjustable plant package arrangements such as shown in Figure 6. The plant package in this case has an adjusting strip 20 of cardboard or the like secured thereto as by a band of adhesive paper tape 21. The strip 20 extends through the slits 15 and is bent over at 20ª to retain the plant at the desired height for shipping purposes.

When the dealer receives the plant pack he may pull downwardly on the strip 20, thus adjusting the plant to a lowered position such as shown by dotted lines in Figure 6, whereupon the end 20ª may be cut off or may be bent and inserted at the front of the package, as shown. This pulls the plant 10 downwardly so that its upper part does not obstruct the purchaser's vision with relation to the advertising device 19.

As shown in Figures 3 and 4, various proportions may be obtained for my plant pack. In Figure 3 the wrapper 13ª is similar to the wrapper 13, except that the inclined edges 14ª are somewhat shortened so that a plant or plants in a pack merely for shipping purposes and not for display purposes is provided. In Figure 4 a relatively long blank 13ᵇ has been provided with relatively long cut-away edges at 14ª, this package being suitable for rosebushes and the like.

Obviously, several different sizes of the wrapper blanks may be made to accommodate different sizes of plants.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention.

1. In a plant pack, a wrapper of cardboard or the like adapted to surround a plant package, said wrapper being tight around the roots in the plant package and loose around the top of the plant, and staples for holding said wrapper around the plant package, one of said staples extending through a lower corner of the package to retain the plant package in position relative to the wrapper.

2. In a plant pack or the like, a wrapper adapted to surround a closed plant package and the top of a plant projecting thereabove, said wrapper being tight around the roots in the plant package and loose around the top of the plant, and means through a lower corner of said plant package and through said wrapper for retaining the wrapper around the plant package and the plant package in position relative to the wrapper.

3. In a plant pack or the like, a wrapper adapted to surround a plant package, said wrapper being tight around the roots in the plant package and loose around the top of the plant, and a staple through said plant package and through said wrapper to retain the package in vertically pitched position relative to the wrapper.

4. A plant pack comprising a wrapper of cardboard or the like adapted to surround a plant package, said wrapper being rectangular in shape with its upper corners cut away at an incline whereby when the wrapper is rolled into a cylinder the cut-away portions at said upper corners permit a view of the inside of the upper part of the wrapper and a display device thereon, said wrapper being formed in the shape of a truncated cone with its smaller part at the bottom to tightly bind the roots in the plant package and leave the plant top loose, staples for holding said wrapper in cylindrical form around the plant package, one of said staples extending through a lower corner of said plant package and through said wrapper to retain the plant package in position relative to the wrapper.

5. A plant pack comprising a wrapper adapted to surround a plant package, said wrapper being rectangular in shape with its upper corners cut away at an incline, a display device in the upper part of the wrapper, said wrapper being formed in the shape of a truncated cone with its smaller part at the bottom, staples for holding said wrapper in form around the plant package, one of said staples extending through a lower corner of the plant package to retain the plant package in position relative to said wrapper.

6. A plant package comprising a cardboard blank of rectangular shape having its upper corners cut away, said blank being adapted to be rolled into a truncated cone-shaped cylinder and stapled in such position, said truncated cone-shaped cylinder being adapted to receive a plant package with the roots in the package at the small end of the cone for compressing the roots and leaving the top of the plant relatively loose, one of the staples extending through a lower corner of the plant package to retain the package in position relative to the wrapper.

7. A plant package comprising a blank of substantially rectangular shape adapted to be rolled into a truncated cone-shaped cylinder, said cylinder being adapted to receive a closed plant package with the roots in the package at the small end of the cone, and means through a corner of said plant package and through said wrapper to retain the plant package in position relative to the wrapper.

CLARK E. GARDNER.